UNITED STATES PATENT OFFICE.

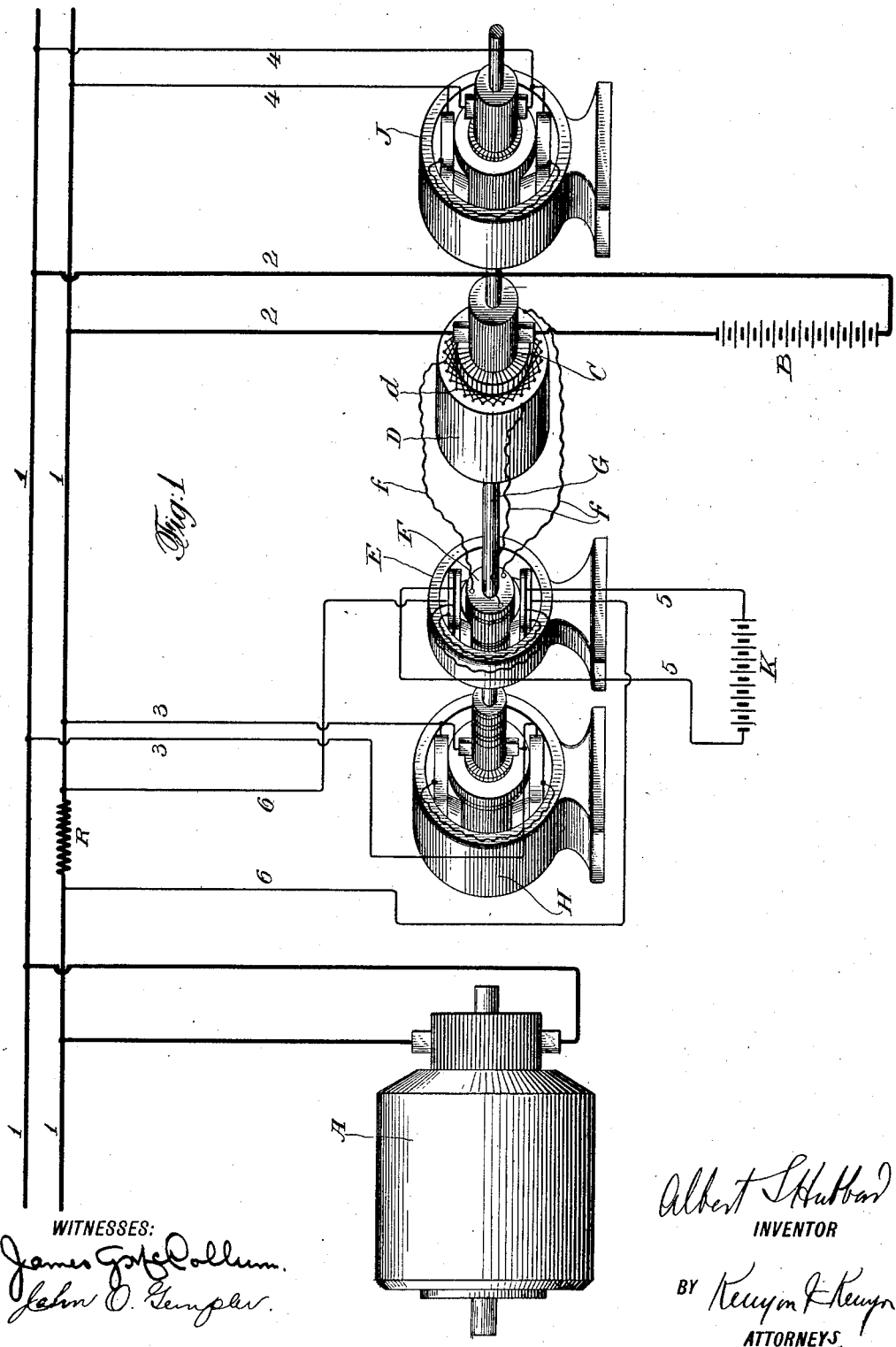

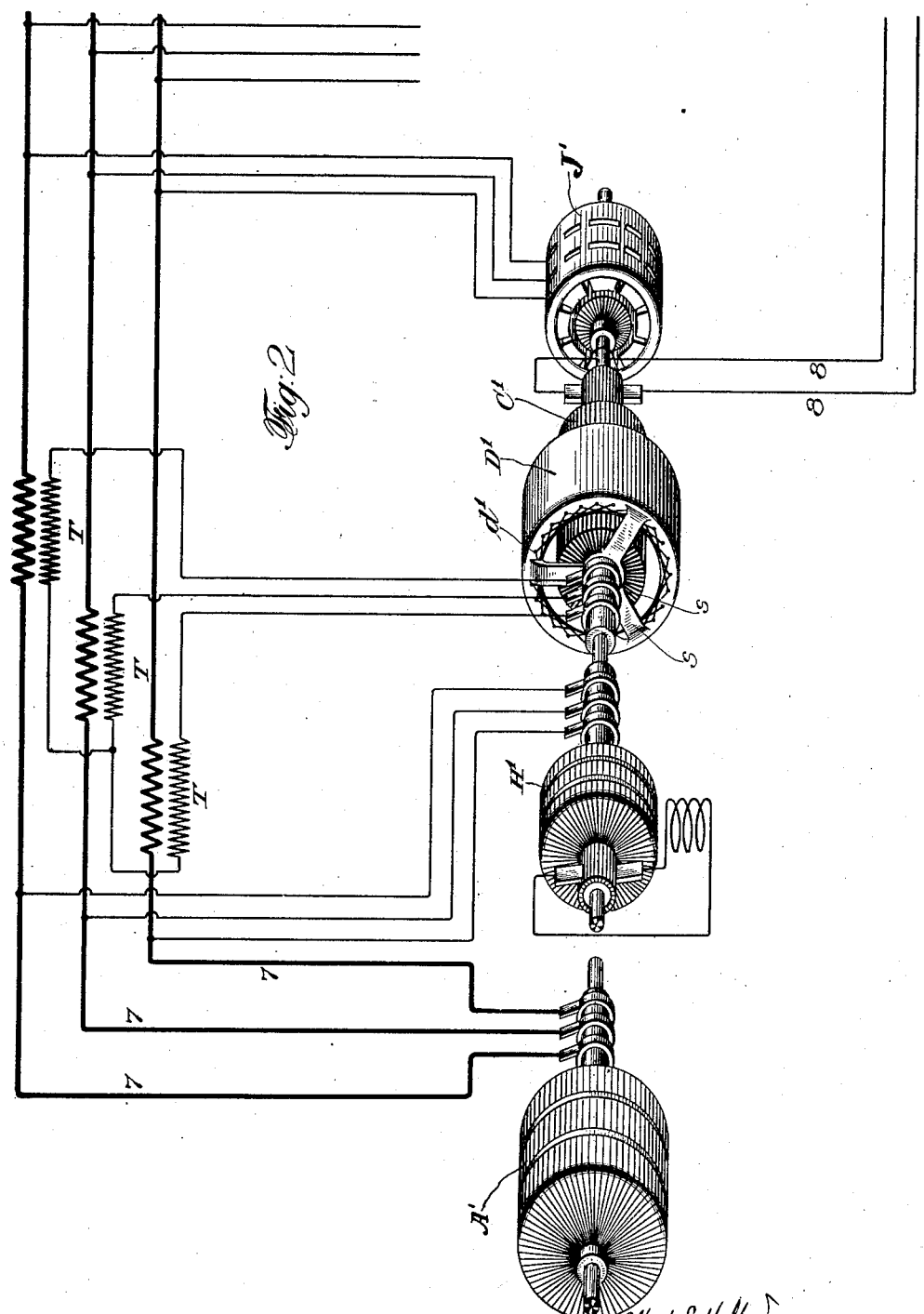

ALBERT S. HUBBARD, OF BELLEVILLE, NEW JERSEY, ASSIGNOR TO GOULD STORAGE BATTERY COMPANY, A CORPORATION OF NEW YORK.

DYNAMO-ELECTRIC MACHINERY.

1,009,310.  Specification of Letters Patent.  Patented Nov. 21, 1911.

Application filed February 25, 1908. Serial No. 417,758.

*To all whom it may concern:*

Be it known that I, ALBERT S. HUBBARD, a citizen of the United States, and a resident of Belleville, county of Essex, and State of New Jersey, have invented certain new and useful Improvements in Dynamo-Electric Machinery, of which the following is a specification.

My invention relates to dynamo electric apparatus and is especially applicable where automatic regulation is desired and it is advantageous to reduce the lag in the regulation as much as possible.

My invention has special utility in regulating storage batteries used as compensatory batteries in electrical systems of distribution and in this application I shall show and describe my novel apparatus applied in a specific way to such a system, but the claims to the system as shown and described herein form no part of the invention claimed in this application but are claimed in my divisional application Serial No. 636,366, filed July 1st, 1911.

My invention involves the provision of a dynamo having a field structure arranged with windings suitable for receiving alternating current, and preferably the currents of a polyphase circuit in which case the windings are so arranged as to produce a rotary magnetic field. Where the dynamo is to be used for regulation the exciting currents for its field are caused to be responsive to variations in the electrical condition of the system for which regulation is required. The armature of my dynamo is preferably of the direct current type having a commutator and brushes and the armature is rotated by any suitable means in the usual manner. In order that the machine may act like a direct current machine despite the fact that its field structure is excited by alternating currents, I provide means for producing a relative rotation between the commutator brushes and the field structure which rotation shall be synchronous with the frequency of the alternating current circuit. In the specific embodiment herein shown and described this is attained by rotating the field structure at synchronous speed in a direction opposite to the rotation of the magnetic flux so that the magnetic field is fixed into space, and therefore acts in the same manner upon the armature as a direct current field would act. By this arrangement I am able to get a direct current from the armature which may be made to change in its value with changes in the intensity of the current of the alternating current circuit and with the power factor changes of said circuit. This dynamo unlike apparatus ordinarily excited by alternating currents acts like a true dynamo to produce a direct current, the energy of which may be varied with changes of the exciting alternating current.

Referring to the drawings, Figure 1 shows one embodiment of my invention, apparatus embodying the principle thereof being applied to a direct current system of distribution. Fig. 2 is a diagram showing apparatus embodying the principle of my invention applied to an alternating and direct current system.

In Fig. 1 of the drawing A represents the armature of a main generator supplying the main distribution circuit, 1, 1. Connected in the circuit 2, 2, across the circuit 1, 1, is a storage battery B, and in series therewith the armature, C, of a booster. The booster is provided with a rotatable field structure, D, provided with distributed windings $d$. Mechanically connected to this field structure, D, and therefore rotating at the same speed therewith is the armature F of an exciting dynamo E. In the armature F there are generated polyphase alternating currents which are delivered to the field winding, $d$, without commutation by means of the conductors, $f$. If these alternating currents were delivered to the windings $d$ while the field structure D was stationary, a rotating field would be set up in said field structure. Therefore the field structure is rotated so that the field flux will always maintain practically the same position. This is accomplished by the mechanical connection, G, between the field structure D and the exciter armature, F, the connections, $f$, being so arranged that the mechanical rotation of the field structure D is opposite to that of the electrical rotation of the field flux therein, whereby the field flux is maintained in a practically fixed position. The exciter armature F is driven at a practically constant speed by the shunt motor H connected to the main circuit, 1, 1, by the leads 3, 3. The booster armature is independently driven at any desired practically constant speed in any well known manner, as by a shunt motor, J, connected to the main circuit, 1, 1, by the leads, 4, 4. The exciter E is provided with two field windings, one of which is connected to a battery K, by leads, 5, 5, and the field strength thereof is therefore maintained at a practically constant value. The other field winding carries a regulating or varying current and is connected by the leads, 6, 6, across the shunt R in the circuit of the main generator, so that the current in this field varies with that of the generator. The two field coils of the exciter E operate in opposition to each other and when the system is working under normal conditions the field strength produced by one is equal to that of the other and hence the resulting field strength of the exciter, E, is *nil*. If the load on the main generator A increases beyond normal and consequently the current in the main circuit increases beyond normal, the current passing through the leads, 6, 6, will increase in value, which will increase the field strength of the coil connected thereto. A resultant field is therefore set up in the exciter E, and, its armature, F, furnishes an alternating current to the field structure D, in such a direction that an electromotive force is set up in the booster armature C. This electromotive force will be in the same direction as that of the battery, B, and will cause it to discharge into the main circuit, 1, 1, to take the extra load imposed thereupon. If the current delivered by the main generator, A, falls below normal, the reverse operations take place and the electromotive force generated in the booster armature causes the battery to be charged from the main circuit, 1, 1.

Referring to Fig. 2, A' represents a main alternating current generator feeding the alternating current circuit 7, 7, 7. In these mains are situated transformers T, the secondaries of which are connected by slip rings *s* to the field windings *d'* of a rotating field structure D' similar to that shown in Fig. 1. The field flux generated in the distributed windings *d'* is maintained at practically the same position by the synchronous rotation of the field structure D' by the synchronous motor H' connected to the circuit 7, 7, 7. The armature C' rotates within the field structure D' and is driven by induction motor J'. The current furnished to the lines 8, 8, by the armature C' is thus responsive to changes in the electrical condition of the circuit, 7, 7, 7, and may be used in any well known manner for the regulation of battery action. By the use of my peculiar dynamo as shown in Fig. 2 efficient regulation for power factor changes of the system is obtained, because a change in the power factor from unity changes the position of the field flux (the field being rotated in synchronism with the voltage, and the current in the field windings being in phase with the current, of the A. C. system) so that the commutator brushes of the dynamo are no longer at the points of maximum armature voltage.

No claims herein are made to the system of distribution as a whole as shown in either or both of the drawings, these systems being shown merely to illustrate the applicability of my improved apparatus. The system shown in Fig. 1 is claimed in my application Serial No. 636,366 filed July 1st, 1911 filed as a division of this application, while the system generically as well as the specific features of the system shown in Fig. 2 of this application is claimed in my application Serial No. 430,633, filed May 4th 1908.

I do not desire to be limited to the specific details shown and described since many changes therein may be made without departing from the spirit of my invention, but

What I claim and desire to secure by Letters Patent, is:

1. The combination of a rotatable field structure excited with alternating current and rotated synchronously with the frequency of said current, an armature having a commutator and rotatable independently of said field structure, and means for supplying alternating current to said field structure.

2. The combination of a field structure and an armature relatively rotatable one to the other, a commutator for the armature provided with brushes, said field structure energized by alternating current, and means for causing a relative movement between the field structure and the brushes, said movement being synchronous with the frequency of the exciting current.

3. The combination of a field structure and an armature relatively rotatable one to the other, and a commutator for the armature provided with brushes, said field structure energized by polyphase alternating currents, the commutator brushes being relatively fixed with respect to the magnetic field whereby direct current is obtained from said armature.

4. The combination of a dynamo provided with a rotatable armature, a commutator therefor and a rotatable field structure energized by alternating current therein and rotatable synchronously with the frequency of said alternating current and an exciting dynamo mechanically connected to said field structure and furnishing said alternating current.

5. The combination of a dynamo provided with a rotatable armature, a commutator and a rotatable field structure energized by polyphase alternating currents therein, an exciting dynamo generating said polyphase currents, and means for rotating said field structure at a speed having a definite relation to that of the armature of said exciting dynamo.

6. The combination of a dynamo provided with a rotatable armature and a rotatable field structure, and an exciting alternating current dynamo for said field structure the armature of which is connected to rotate at the same speed as said field structure and supplying alternating current thereto.

7. The combination of a dynamo provided with a rotatable armature and a rotatable field structure energized by alternating current therein, and an exciting dynamo the armature of which is mechanically connected to rotate at the same speed as said field structure and in which said alternating current is generated.

8. The combination of a dynamo provided with a rotatable armature and a field structure energized by polyphase currents and rotatable independently of said armature, and an exciting dynamo the armature of which is connected to rotate at the same speed as said field structure and in which said polyphase currents are generated.

In testimony whereof, I have signed my name to this specification, in the presence of two subscribing witnesses.

ALBERT S. HUBBARD.

Witnesses:
GORHAM CROSBY,
EDWIN SEGER.

---

Copies of this patent may be obtained for five cents each, by addressing the "Commissioner of Patents, Washington, D. C."